United States Patent [19]

Mojonnier et al.

[11] 4,112,828
[45] Sep. 12, 1978

[54] REFLUX DEAERATION SYSTEM

[75] Inventors: Harry G. Mojonnier, River Forest; Sigmund P. Skoli, Elmwood Park, both of Ill.

[73] Assignee: Mojonnier Bros. Co., Chicago, Ill.

[21] Appl. No.: 821,215

[22] Filed: Aug. 2, 1977

Related U.S. Application Data

[63] Continuation of Ser. No. 654,596, Feb. 2, 1976, abandoned.

[51] Int. Cl.² ............................................. C02D 1/04
[52] U.S. Cl. ............................................. 99/275; 55/89; 55/189; 261/DIG. 7; 261/DIG. 27; 426/475; 426/477; 426/487
[58] Field of Search .............. 426/475, 477, 487; 261/DIG. 7, DIG. 27; 55/193, 89, 189; 210/188; 99/275

[56] References Cited

U.S. PATENT DOCUMENTS

| 487,342 | 12/1892 | Witleman | 426/477 |
|---|---|---|---|
| 2,455,681 | 12/1948 | Kantor et al. | 426/477 |
| 2,510,498 | 6/1950 | Gaeng | 426/487 |
| 2,870,016 | 1/1959 | Day et al. | 426/477 |
| 2,906,624 | 9/1959 | Deren | 426/475 |
| 3,044,878 | 7/1962 | Knedlik | 462/477 |
| 3,256,802 | 6/1966 | Karr | 261/DIG. 7 |
| 3,612,495 | 10/1971 | Cupping | 261/DIG. 7 |
| 3,741,552 | 6/1973 | Skoli | 261/DIG. 7 |
| 4,068,010 | 1/1978 | Karr | 261/DIG. 7 |

FOREIGN PATENT DOCUMENTS

| 864,550 | 4/1961 | United Kingdom | 426/477 |
|---|---|---|---|
| 557,186 | 11/1943 | United Kingdom | 426/487 |

*Primary Examiner*—S. Leon Bashore
*Assistant Examiner*—Steve Alvo
*Attorney, Agent, or Firm*—Olson, Trexler, Wolters, Bushnell & Fosse, Ltd.

[57] ABSTRACT

A reflux deaeration system is disclosed which removes air from water used in producing carbonated beverages. Carbonating gas under relatively high pressure is conducted from a beverage carbonating mechanism to a water conduit for mixing with the water. In accordance with the qualitative principles of Dalton's Law, the introduced carbonating gas drives out air dissolved in the water.

12 Claims, 4 Drawing Figures

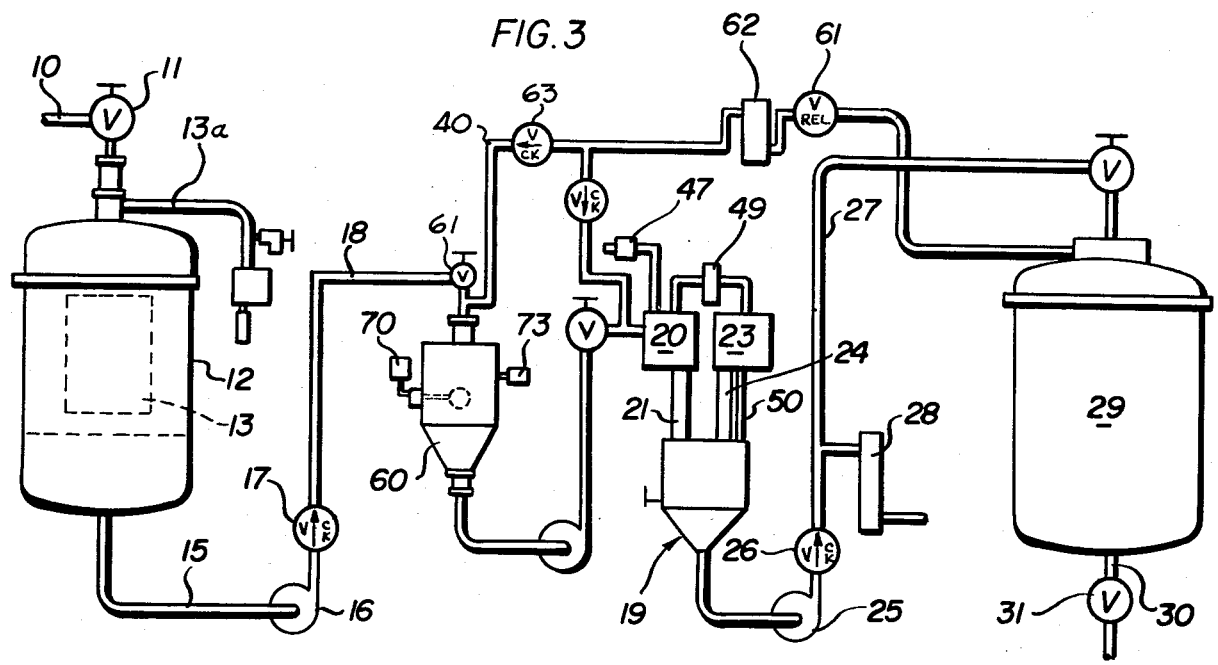
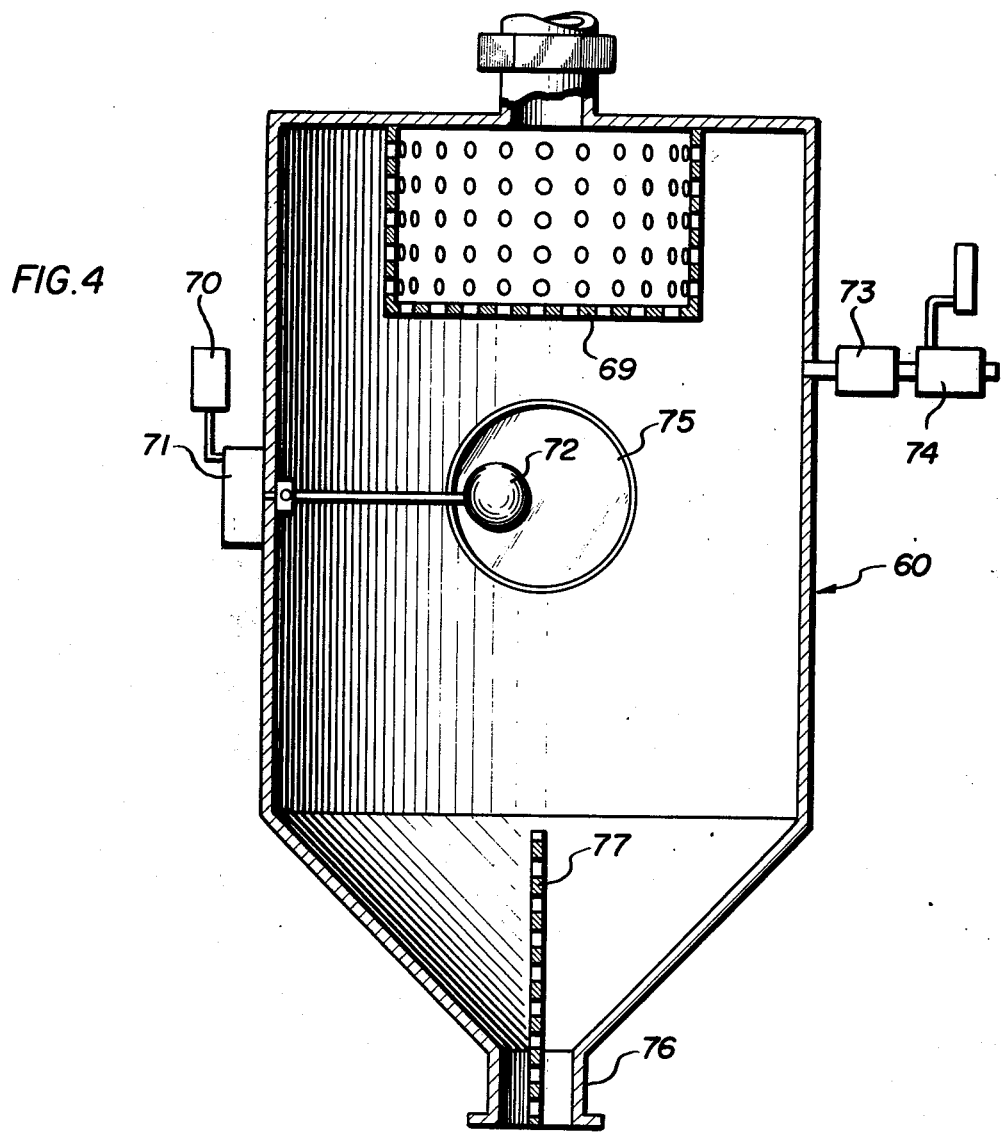

REFLUX DEAERATION SYSTEM

This is a continuation, of application Ser. No. 654,596, filed: Feb. 2, 1976 and now abandoned.

BACKGROUND OF THE INVENTION

This invention relates generally to beverage processing systems and more particularly concerns apparatus for removing air from the beverage being processed.

Modern beverage processing systems prepare or formulate large amounts of soft drink beverage or the like and place the beverage in containers such as cans or bottles at high rates of speed. These containerized beverages are then shipped through distribution channels to retail stores and the like where they are purchased for consumption.

In the preparation of modern soft drinks, the dissolved air must be removed from the beverage if the beverage end product is to be of uniformly high quality and long shelf life. Deaeration improves beverage stability in the filling process, minimizing foaming action in and out of the container during the period after the container has been filled and before the container closure is applied. If the beverage is contained within a can, inclusion of air can permit deterioration of the plastic can lining thereby damaging the can and spoiling the flavor of the beverage. Such occurrences are, of course, deleterious to the reputation and the subsequent sales efforts of the beverage maker.

Modern beverage preparation and bottling systems include a source of treated water, which can be routed through a deaeration mechanism to a beverage proportioner. In this proportioner, a given amount of water is mixed with another appropriate amount of beverage syrup to form an uncarbonated beverage mix. The beverage mix is then sent through a carbonator, in which carbon dioxide gas is introduced to the beverage mix. The resulting carbonated beverage is then routed to a filler for its introduction to bottles, cans or other containers.

In many modern systems, the deaerator includes a vessel in which a vacuum is created. When the treated, air-containing water is introduced into this vacuum environment, the air escapes from its dissolved state within the water, and is drawn from the vessel through an appropriate vacuum-maintaining pumping system. Such deaerators are described in U.S. Pat. Nos. 3,584,438 and 3,574,987.

Practical experience with these systems has shown that under some operating conditions, lubricants required in the vacuum-maintaining pumps can find their way into the water being vacuum treated. Inclusion of even miniscule amounts of lubricant within the beverage water can produce an undesirable flavor in the beverage end products.

It is an object of the present invention to minimize or eliminate the use of vacuum-type deaeration equipment within the beverage processing system.

Yet another object is to provide a beverage processing system in which the beverage carbonating gas is used to deaerate the beverage as well.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 3 is a schematic diagram similar to FIGS. 1 and 2 and showing yet another embodiment of the invention including a reflux deaeration vessel; and FIG. 4 is a sectional view of the reflux deaeration vessel shown in FIG. 3.

DETAILED DESCRIPTION

While the invention will be described in connection with a preferred embodiment or procedure, it will be understood that it is not intended to limit the invention to this embodiment or procedure. On the contrary, it is intended to cover all alternatives, modifications and equivalents as may be included within the spirit and scope of the invention as defined by the appended claims.

Figure 1:
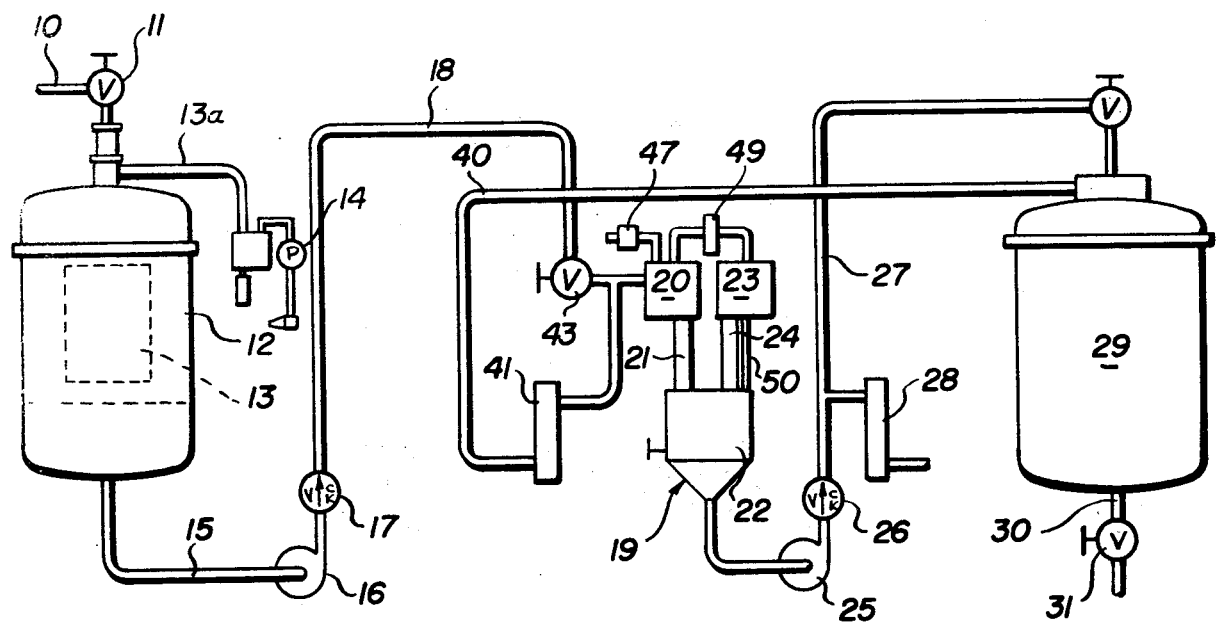
FIG. 1 is a schematic diagram of a beverage processing system including the present invention.
Figure 2:
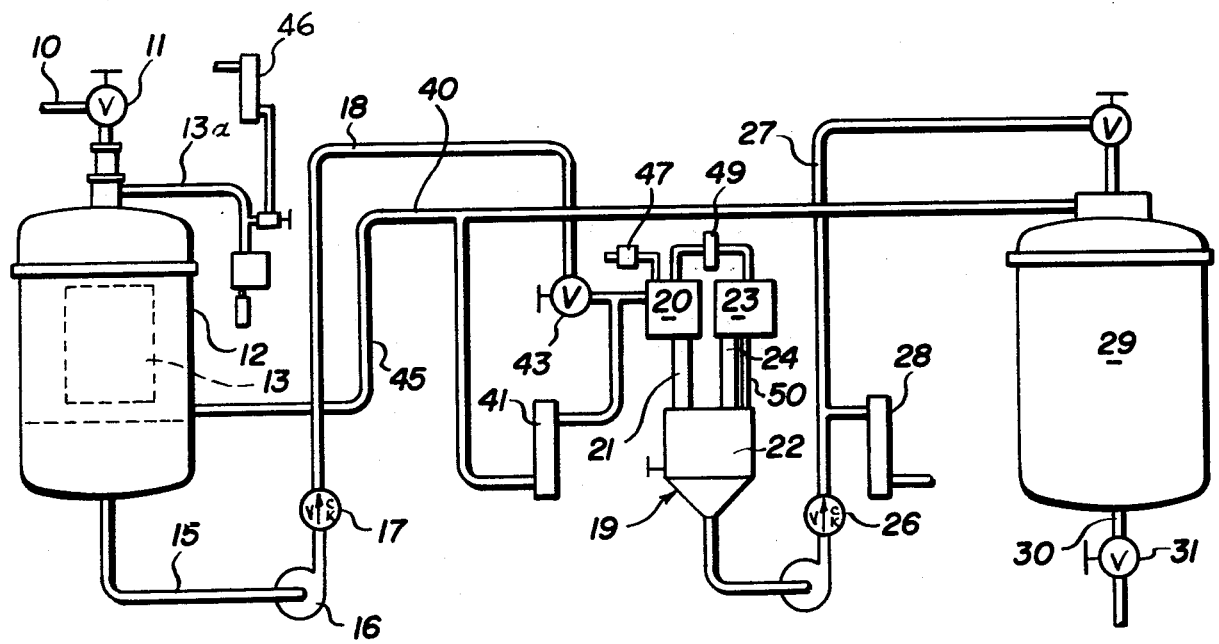
FIG. 2 is a schematic diagram of a beverage processing system similar to FIG. 1 but showing a modified embodiment of the invention.

Turning first to FIGS. 1-3, there is shown, in schematic form, a modern beverage processing system. Here, appropriately treated water is provided from an inlet source 10 through appropriate valving 11 to a vacuum treatment vessel 12. In prior systems, the water has been caused to flow over internal vessel plates 13 which can be refrigerated to cool the water to a relatively low temperature.

To withdraw air from the water in previously offered systems, the interior of the vessel 12 has been maintained at a vacuum or negative pressure. Under these conditions air dissolved within the water escapes from the water, and has been drawn from the vessel 12 through appropriate piping 13a and a vacuum pump 14. The deaerated water flows through outlet piping 15, a water pump 16 and a check valve 17, and is directed by a first conduit 18 to a proportioner device 19. In both the present invention and previously known systems, the water is introduced into a proportioner water chamber 20.

In the proportioner, the water flows from the water chamber 20 at controlled rates and in controlled amounts down a column 21 to a mixing chamber 22. Simultaneously with this flow of water, a beverage ingredient-containing syrup is introduced into a syrup chamber 23 and is also drawn at controlled rates and in controlled amounts down a corresponding column 24 for simultaneous introduction into the mixing chamber 22. After thorough mixing, the syrup and water beverage mix is propelled by a pump 25 through a check valve 26 into relatively high pressure piping 27. At an appropriate point in this piping 27, a gas such as carbon dioxide is introduced through an appropriate flow meter 28. The gas and beverage mix then flow to a carbonator 29 where the beverage mix and carbon dioxide are thoroughly mixed to form a carbonated beverage. An excess of carbon dioxide is introduced through the flow meter 28 and into the carbonator 29 so as to insure complete carbonation of the beverage. Thus, the upper regions of the carbonator 29 are maintained as a high pressure carbon dioxide atmosphere. Carbonator outlet piping 30 and appropriate valving 31 direct the carbonated beverage to a can, bottle or other container filler (not shown) for final containerization.

In accordance with the invention, deaeration can be accomplished in conformity with the qualitative principles of Dalton's Law: the quantity of gas dissolved in a given quantity of solvent is proportional to its partial pressure over the solution. Here, gas such as air which is dissolved in the water can be displaced by the introduction of carbon dioxide.

In carrying out the invention, therefore, the carbon dioxide at high pressure in the carbonator 29 is directed to upstream portions of the beverage preparation system and is introduced into the water which is maintained at a pressure which is low relative to the carbon dioxide gas pressure. Charging the water with carbon dioxide causes the dissolved air to be displaced from the water and replaced with the carbon dioxide. Here, the high pressure carbon dioxide is introduced into the first conduit 18 at a point located between the upstream pump 16 and the check valve 17 on one side, and the downstream proportioner 19 on the other side.

It will be understood that not all the air will be removed from the water by this reflux method. However, by appropriately choosing the relative proportions of the water and dissolved air on one hand and the injected carbon dioxide on the other hand, a high proportion of the air can be withdrawn from the water. In this way, the amount of air still dissolved within the water and ultimate beverage product can be reduced to a practicably negligible amount. If desired, this reflux approach can permit the elimination of the preliminary vacuum treating device 12 from the system. To this end, carbon dioxide is drawn from the carbonator 29 through a second conduit 40 and is introduced, by a flow meter 41, into the first water-carrying conduit 18 by appropriate valving 43, as shown in FIG. 1.

If operating conditions require, the vacuum treating device 12 can be maintained within the system with the vacuum pump inoperative, and a second conduit extension 45 can be used to introduce carbon dioxide into the system 12 as shown in FIG. 2. Again, relatively low pressure water and dissolved air are treated with carbon dioxide, resulting in the elimination of a large proportion of the air from the water and its replacement with carbon dioxide. Excess gas (a mixture of carbon dioxide and air) is purged from the system through a flow meter 46.

As the water and carbon dioxide mix reach the water reservoir 20 of the proportioner 19, an exhaust valve 47 eliminates further liberated air and undissolved carbon dioxide from the system. Interconnecting lines 49 and 50 can be provided to further direct carbon dioxide to the proportioner syrup tank 23 and proportioner mixing tank 22, as shown in FIGS. 1-3.

As explained above, the preparation of beverages for use in canning systems requires removal of dissolved air to an especially high degree. In connection with the present invention, complete carbon dioxide-water mixing provides a correspondingly complete removal of air. To effect this mixing, a reflux deaeration vessel 60 can be provided in the second conduit line as illustrated in FIG. 3 and can be utilized as a replacement or substitute for the vacuum treating vessel 12 and related equipment. Here, high pressure carbon dioxide is introduced by the second conduit 40 through an appropriate flow regulating valve 61, a flow meter 62 and a check valve 63 to the water within the first conduit 18. The water and carbon dioxide are then directed into the vessel 60 as can be envisioned from FIG. 4.

The incoming water and carbon dioxide first pass through a velocity reducer 69 which here comprises a perforated box device. A pilot controlled water valve 70 responsive to air switch 71, and operated by an appropriate float 72, maintains a predetermined volume of water within the vessel. Here, the water and intimately mixed carbon dioxide are permitted to freely intermingle at relatively low flow rates or velocities, thus permitting complete carbon dioxide-air interchange within the water. Air driven from the water and undissolved carbon dioxide are exhausted from the vessel through a pressure relief valve 73 which can be set at an appropriate pressure by a pressure regulator device 74. A sight port 75 can be provided to permit operator observation of system operation. The water, now containing a small proportion of dissolved air and a relatively large proportion of dissolved carbon dioxide, passes from the reflux vessel 60 through an exhaust or outlet 76. To discourage swirling action within the water, an anti-swirl baffle 77 can be located within this outlet 76.

The invention is claimed as follows:

1. In a beverage processing system comprising a source of treated water containing dissolved air, a proportioner for adding beverage ingredients to the water to form a beverage, a first conduit means connected between the source of treated water and the proportioner, pump means connected in the first conduit means for pumping the water from the source to the proportioner at a given low pressure, a combined carbonator and cooler unit for cooling the beverage and for primarily adding carbon dioxide gas to the beverage to form a carbonated beverage, first conduit extending means between the proportioner and the combined carbonator and cooler unit for delivering the beverage from the proportioner to the combined carbonator and cooler unit, means for introducting carbon dioxide into the combined carbonator and cooler unit at a given high pressure, said high carbon dioxide pressure being greater than said low water pressure in said first conduit means, the improvement comprising second conduit means connected between the combined carbonator and cooler unit and a point in the first conduit means, the point being located between the pump means and the proportioner means, the second conduit means being provided for preliminarily introducing carbon dioxide gas, at the given carbonator and cooler unit high pressure, from the combined carbonator and cooler unit to the water at the given water low pressure in the first conduit so as to drive out air dissolved in the water by replacing the dissolved air with carbon dioxide gas, and check valve means for prohibiting the flow of water and gas backward along the first conduit toward the pump means and water source, and exhaust means connected to the proportioner for exhausting said air and undissolved carbon dioxide from the system.

2. A reflux deaeration system according to claim 1 including additional conduit means for introducing carbon dioxide gas from the second conduit means to the first extending means so as to drive out air dissolved in the formed beverage by replacing the air with the carbon dioxide gas.

3. A reflux deaeration system according to claim 1 including preliminary vacuum treatment vessel means located downstream of said source of water and upstream of said high pressure carbon dioxide introduction point and said proportioner for preliminarily withdrawing air from the water.

4. A reflux deaeration system according to claim 3 including second conduit extension means for leading carbon dioxide gas from the carbonator and the second conduit means to the preliminary treatment means so as to introduce carbon dioxide gas to the water as air is being preliminarily withdrawn from the water.

5. A reflux deaeration system according to claim 3 including vacuum means located between said water source and said proportioner for imposing a vacuum on said water to preliminary release dissolved air from water.

6. A reflux deaeration system according to claim 1 including reflux vessel means for mixing the water received from said source and carbon dioxide gas, received from said carbonator and cooler unit.

7. A reflux deaeration system according to claim 6 wherein said reflux vessel includes velocity reducing means for reducing the velocity of said water flowing into the vessel.

8. A reflux deaeration system according to claim 6 wherein said reflux vessel includes flow control means for maintaining a quantity of water within the vessel at a predetermined level.

9. A reflux deaeration system according to claim 6 wherein said reflux vessel includes anti-swirl means for inhibiting swirling motion of water leaving the vessel.

10. A reflux deaeration system according to claim 6 wherein said reflux deaeration vessel includes pressure relief valve means for exhausted air and undissolved carbon dioxide from said vessel.

11. A beverage processing system comprising a source of treated water containing dissolved air, a proportioner for adding beverage ingredients to the water to form a beverage, a first conduit means connected between the source of treated water and the proportioner, pump means connected in the first conduit means for pumping the water from the source to the proportioner at a given low pressure, a combined carbonator and cooler unit for cooling the beverage and for primarily adding carbon dioxide gas to the beverage to form a carbonated beverage, first conduit extending means between the proportioner and the combined carbonator and cooler unit for delivering the beverage from the proportioner to the combined carbonator and cooler unit, means for introducing carbon dioxide into the combined carbonator and cooler unit at a given high pressure, said high carbon dioxide pressure being greater than said low water pressure, second conduit means connected between the combined carbonator and cooler unit and a point in the first conduit means, the point being located between the pump means and the proportioner means, the second conduit means preliminarily introducing carbon dioxide gas at the given carbonator and cooler unit high pressure from the combined carbonator and cooler unit to the water at the given water low pressure in the first conduit so as to drive out air dissolved in the water by replacing the dissolved air with carbon dioxide gas, and check valve means for prohibiting the flow of water and gas backward along the first conduit toward the pump means and water source, and exhaust means connected to the proportioner for exhausting said air and undissolved carbon dioxide from the system.

12. A beverage processing system according to claim 11 including reflux vessel means for receiving water and carbon dioxide gas and for mixing water received from said source and carbon dioxide gas received from said carbonator.

* * * * *